United States Patent [19]

Steinkirchner

[11] Patent Number: 5,488,491
[45] Date of Patent: Jan. 30, 1996

[54] IMAGE PROCESSING APPARATUS AND METHOD FOR ELIMINATING BACKGROUND DENSITY IN A DESIGNATED IMAGE AREA

[75] Inventor: James J. Steinkirchner, Brockport, N.Y.

[73] Assignee: Eastman Kodak Company, Rochester, N.Y.

[21] Appl. No.: 86,391

[22] Filed: Jul. 6, 1993

[51] Int. Cl.⁶ .................................................. H04N 1/38
[52] U.S. Cl. ........................... 358/501; 358/537; 358/538; 358/401; 358/452; 358/453; 358/464; 382/163; 382/171; 382/275
[58] Field of Search ....................... 358/462, 464, 358/465, 466, 463, 447, 448, 452, 453, 530, 537, 538, 300; 382/50, 51, 274, 275, 163, 171, 172

[56] References Cited

U.S. PATENT DOCUMENTS 4,907,286  3/1990  Yamada ........................... 382/172
4,975,768  12/1990  Takaraga ........................ 358/464

FOREIGN PATENT DOCUMENTS

WO93/045554  3/1993  WIPO.

*Primary Examiner*—Scott A. Rogers
*Attorney, Agent, or Firm*—Norman Rushefsky

[57] ABSTRACT

A reproduction apparatus such as one having an electronic electrophotographic marking engine includes an image scanning device for scanning and outputting signals representing image density data on a document. An area designating device such as a digitizing tablet is provided for generating signals representing information relative to a selected image area of the document containing both foreground and background density. A processor is responsive to the density and area signals for operating on the image data in the area to define clipping signals representing parameters for substantially eliminating the background density while substantially preserving information with foreground density.

24 Claims, 9 Drawing Sheets

```
Fiscal year ended ______________________
First name and Initial (if joint return, enter both)         La
       SAWYER LEGHOFF
Home address (Number and street or rural route)
       9986 MOUNTAIN TRAIL
City, village, post office and state
       SYRACUSE, PA.
```

```
Fiscal year ended ______________________
First name and Initial (if joint return, enter both)         La
       SAWYER LEGHOFF
Home address (Number and street or rural route)
       9986 MOUNTAIN TRAIL
City, village, post office and state
       SYRACUSE, PA.
```

IMAGE PROCESSING APPARATUS AND METHOD FOR ELIMINATING BACKGROUND DENSITY IN A DESIGNATED IMAGE AREA

BACKGROUND OF THE INVENTION

1. Field of the Invention

This invention relates to a method and apparatus for automatically reducing background density in a designated area of a document sheet when reproducing the document sheet. The invention provides particular utility in electrostatographic reproduction apparatus and methods.

2. Description of the Related Art

Digital monochrome copiers have the ability to perform an "Auto Exposure" feature that is used to automatically sense the background intensity of an original with a non-white background and adjust the background to become white. A typical example of this feature is an operator trying to copy an original that has black text on a green background such as an income tax form. Without the feature, the original would print with an undesirable gray background. The operator may be able to get rid of the background gray with several empirical adjustments to exposure and contrast; however, this is inefficient. An Auto Exposure feature allows the operator to automatically make this adjustment simply by selecting the feature.

Traditionally, Auto Exposure features are limited for several reasons. First, the background is only sensed at a fixed position on the platen allowing the feature to be easily fooled, typically by an inexperienced operator not placing the original in the correct place on the platen where the sample takes place or by using an undersized original. Second, typically only a small number of samples are taken making the feature susceptible to error because of the limited amount of data the algorithm decisions are made from. Third, the feature is perforated over the entire original image, whereas only a portion of the image requires adjustment of background.

It is therefore an object of the invention to provide an electronic copier apparatus and method which overcomes the disadvantages of the prior art.

SUMMARY OF THE INVENTION

The above and other objects of the invention which will become apparent upon reading the specification are realized by an electrostatographic reproduction apparatus comprising scanning means for scanning and outputting first signals representing intensity variations in an original image on a document sheet; designating means for generating second signals representing information relative to a determined image area of the document sheet containing both foreground information and background density; area operation means responsive to the first and second signals for generating third signals representing parameters for substantially eliminating the background density while substantially preserving information with foreground density; and an electrostatographic marking engine including means responsive to said third signals for reproducing a copy of the document sheet with the foreground information without the background density in the area corresponding to the determined area.

In accordance with another aspect of the invention, there is provided an image processing apparatus and method comprising scanning means for scanning and outputting first signals representing image data on a document as determined by sensing variations in an original image; area designating means for generating second signals representing information relative to a determined image area of the document containing both foreground and background density; area operation means responsive to the first and second signals for operating on the image data in the area to define third signals representing parameters for substantially eliminating the background density while substantially preserving information with foreground density.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

The preferred embodiments are described herein with reference to an electrophotographic copier, but it will be understood that the invention can be used in any form of black and white or color electronic copier. The description will be directed in particular to elements forming part of, or cooperating more directly with, apparatus in accordance with the present invention. It is to be understood that elements not specifically shown or described may take various forms well known to those skilled in the art.

Figure 1:
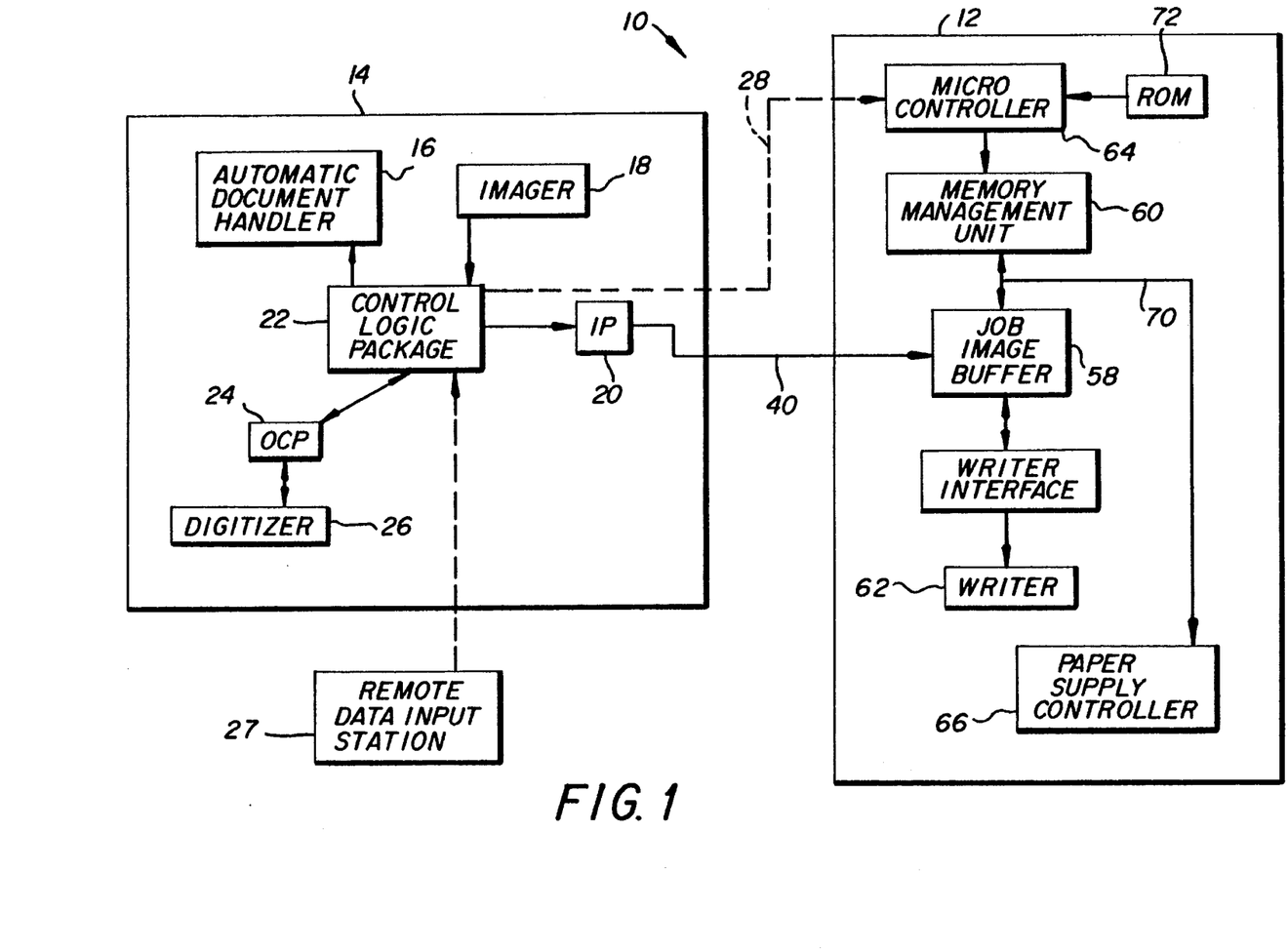
FIG. 1 is a schematic block diagram of a copier according to a preferred embodiment of the present invention.

According to FIG. 1 and with reference to U.S. Pat. No. 5,109,252, a copier 10 includes a marking engine 12 and a document scanner 14. Scanner assembly 14 comprises an automatic document handler 16 for stream feeding multiple original document sheets past an optical system. Focused light reflected from an original document sheet image is swept past an imager or scanner device 18 such as a linear array of photo transducers (photo diodes or charge coupled devices) for converting the image on the original document into electrical signals having values representative of the image density at associated pixel areas on the original document.

As the scanning of the original document sheet proceeds in a direction perpendicular to the imager 18 and row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

Scanner assembly 14 also includes a control logic package 22 having an integral data input station comprising an operator control panel 24 and a digitizer 26, for the operator to input functions and to receive messages from the copier. Alternatively, setup instructions may be received via removable memory media from a remote data input station 27.

The logic package consists of control software, interface software and logic hardware. Setup instructions are input to the scanner, while synchronization signals to identify separate scan lines and to provide page information and marking engine control, as well as information for finishing and processing of jobs, will be sent to marking engine 12 via a job control communications link 28. The marking engine may comprise an ink jet, thermal, photographic or electrostatographic print engine wherein a source of electrical signals modifies a writer to print images in accordance with electronic signals. Electrophotographic print images using LEDs or laser writer are preferred which modulate light with image data to record on a photoconductive recording medium. Modulated electrostatic images on the medium are developed with electroscopic toners and transferred to a record copy such as plain paper or plastic sheets, see for example U.S. Pat. No. 4,949,190, the pertinent contents of which are incorporated herein by reference. In a preferred embodiment, a grey level printhead is used such as an LED printhead wherein a multibit data signal representing density of each pixel to be recorded is output to the printhead to record pixels of varying grey levels in accordance with a multibit image data signal. An example of a grey level LED printhead is described in U.S. Pat. No. 5,126,759, the pertinent contents of which are incorporated herein by reference.

Figure 2:
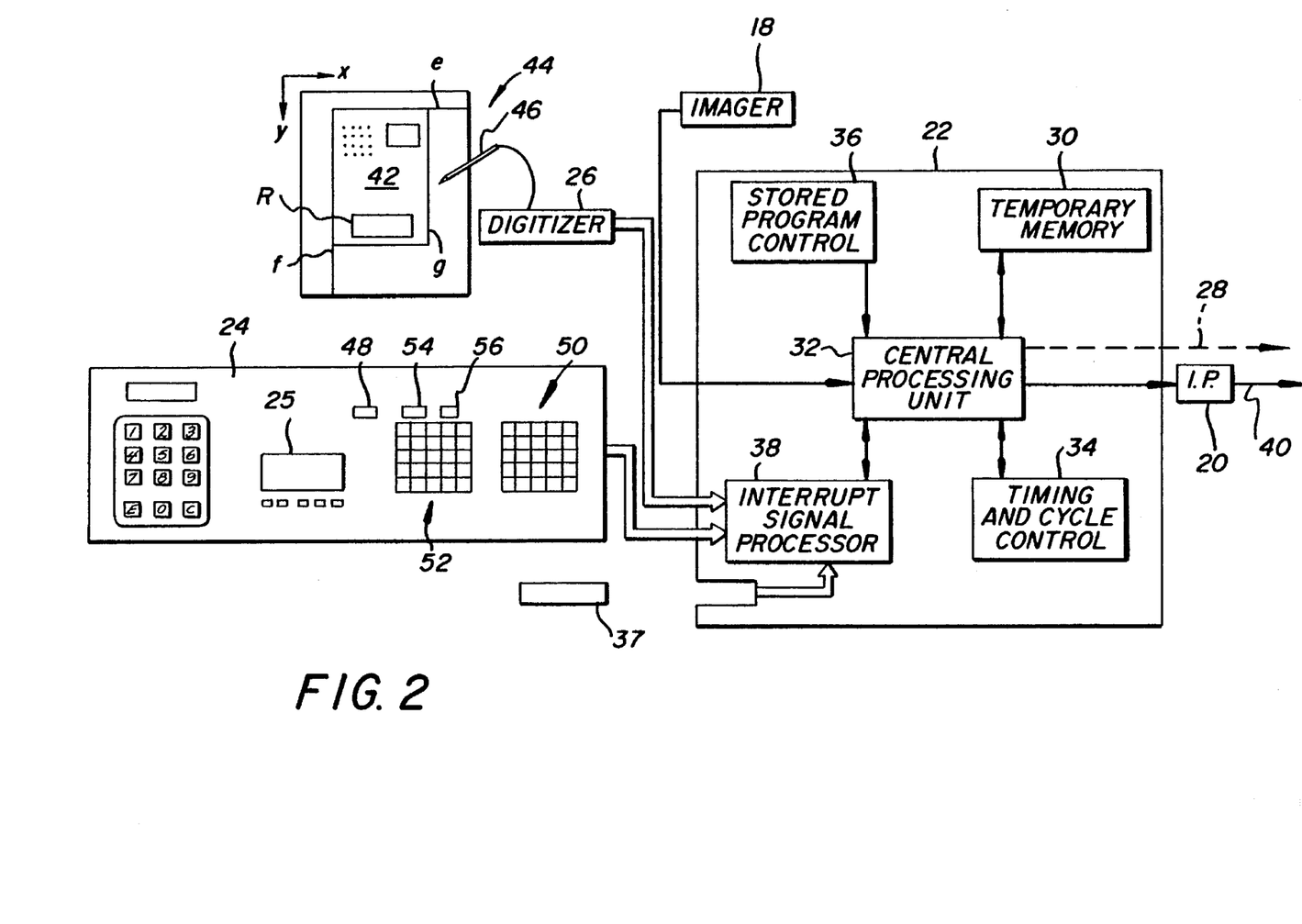
FIG. 2 is a schematic view illustrating a data input station and block diagrams of controls for controlling the copier of FIG. 1.

FIG. 2 is a more detailed block diagram of control logic package 22, operator control panel 24 with soft-key-provided LCD display screen 25, and digitizer 26. Display screen 25 provides text, graphics and softkey selections. Messages and graphics are used to guide the operator through the various modes of operation explained below.

The control logic package comprises temporary data storage memory 30, central processing unit 32, timing and cycle control unit 34, and stored program control 36. Data input and output is performed sequentially under program control. Input data are received from imager 18. Setup and control signals are received either from operator control panel 24 and digitizer 26 or a removable memory media 37 through an interrupt signal processor 38. The output data is applied through processing electronics 20 and an image data bus 40, and control signals are applied via control communications link 28, to marking engine 12.

Integral digitizer 26 may take any of several well known forms wherein an original 42 is placed face up on a tablet 44. A wand 46 associated with the tablet is used by the operator to designate various positions on the original. Transducers located beneath the original produce signals relating the position of the positions touched relative to an edge of the tablet. Alternatively, the tablet may be of the known sonic type wherein a spark formed by a wand creates sound waves in the air which are sensed by microphones placed along a side or sides of the tablet or wherein a sensor is placed in the wand and sources at known points on the side or sides of the tablet emit sonic signals. Remote data input station 27 is provided with a similar digitizer, not shown.

In order to identify or designate a particular region R of original document sheet 42 for auto-exposure processing, the document sheet is placed face up on digitizing tablet 44 and registered against an appropriate corner (or centered relative to a predetermined edge). Wand 46 is used by the operator to designate the format of the original and the locations of the various parts of the image information. The operator calls up special programs for accomplishing various area level tasks via operator control panel (OCP) inputs.

Inputs from the digitizer and associated buttons are inputted into control logic package 22 through interrupt signal processor 38 and are stored in temporary memory 30.

The operator next takes the original document 42 and places it on the exposure platen (using document handler 16, for example) so that the side to be reproduced faces the exposure lamps and registers the sheet with the appropriate corner (or centers it against a registration edge). The stored program control on the control logic package has a program for compensation for the reversal of the sheet vis-a-vis the location of areas when the sheet is face up versus the location of these areas when the sheet is turned over for exposure. Alternatively, format input may not be needed where the same point on the sheet is registered when the sheet is both face up and face down. For example, where the sheet is registered when face up using centering of its left edge for digitizing and then inverted for exposure so that the same edge is again centered, the location of the digitized areas is known without need of format input.

Referring again to FIG. 1 marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a microcontroller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets including selection for output trays, stapling, sorting, folding, finishing, mailbox, envelope receiver, etc.

Microcontroller 64 has associated with it RAM for storing image location addressed, and a read-only memory 72 in which is stored various fixed forms such as test patterns, density patch patterns for process control purposes, billing forms, etc.

Figure 3:
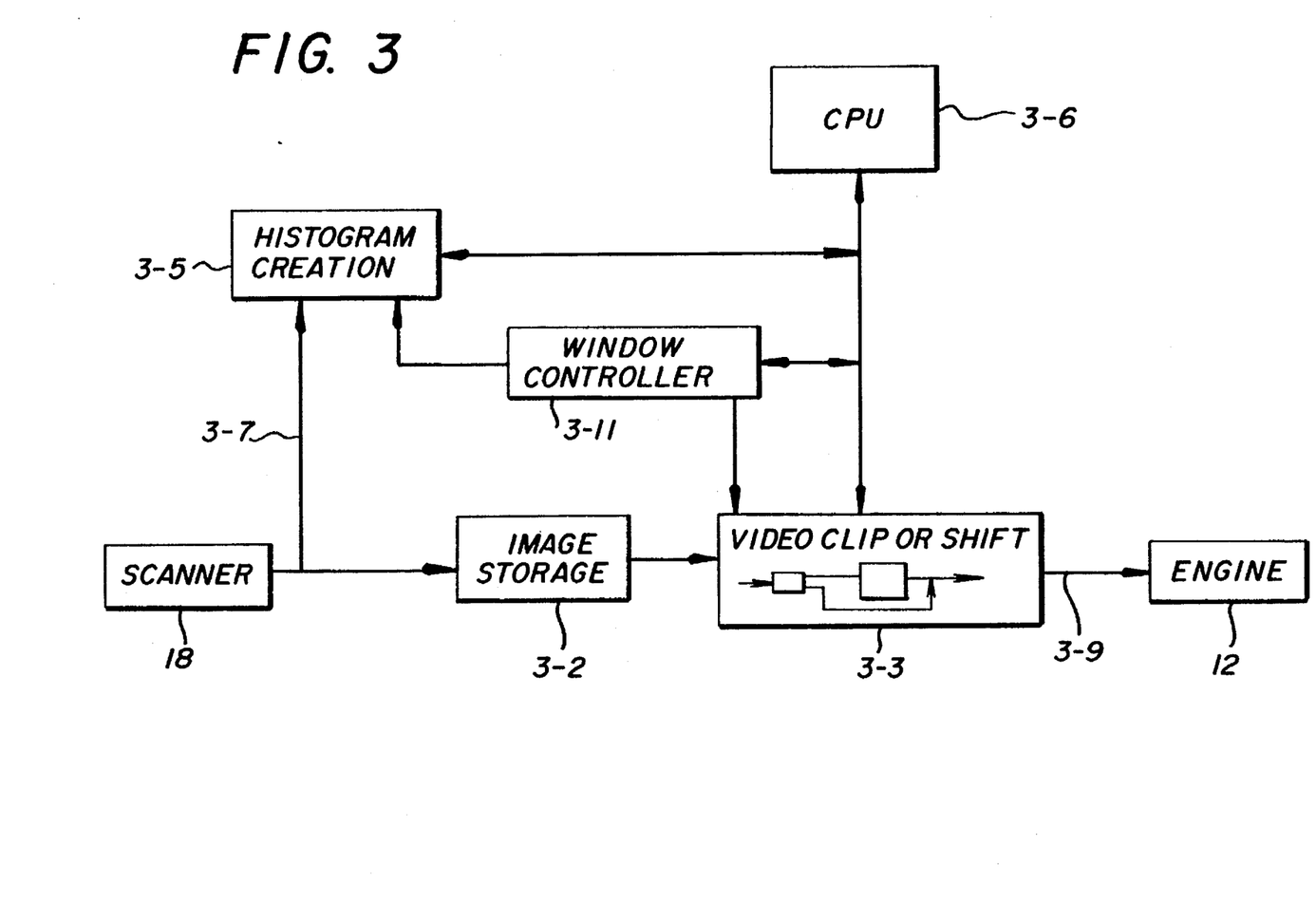
FIG. 3 is a block diagram of portions of the electronic copier apparatus of FIG. 1 and showing in more detail elements associated with the apparatus and method of the invention.
Figure 11:
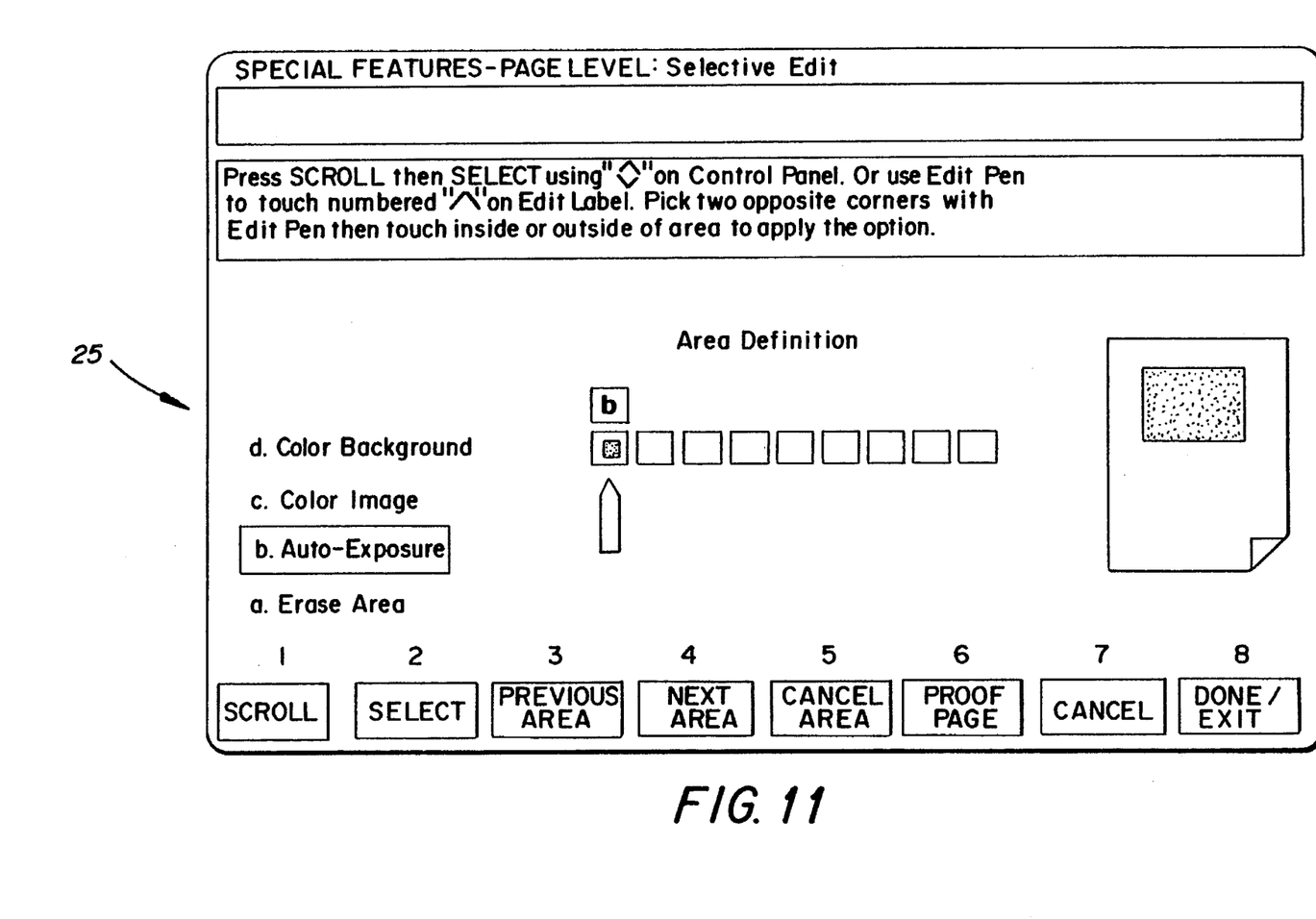
FIG. 11 is an illustration from a display screen of an operator control panel illustrating selection of an area in an auto-exposure mode.
Figure 12:
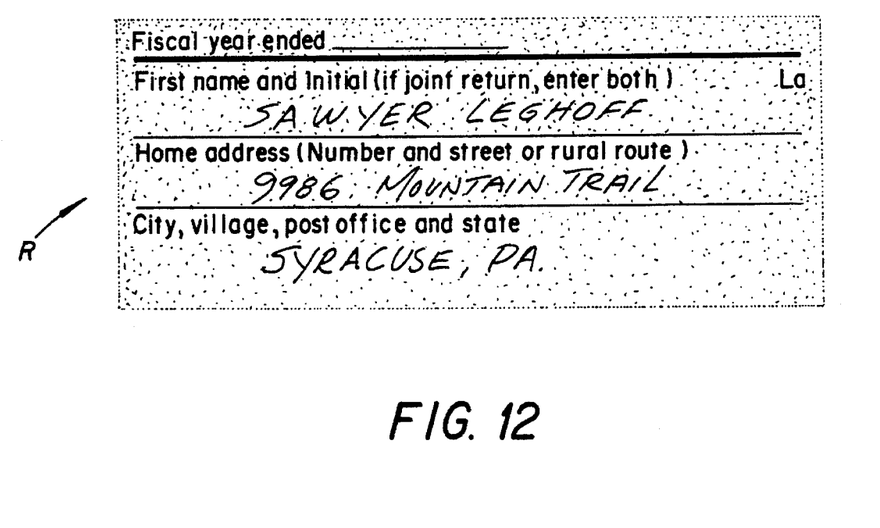
FIG. 12 is an illustration of a reproduction of a portion of a document sheet that is reproduced without auto-exposure correction.
Figure 13:
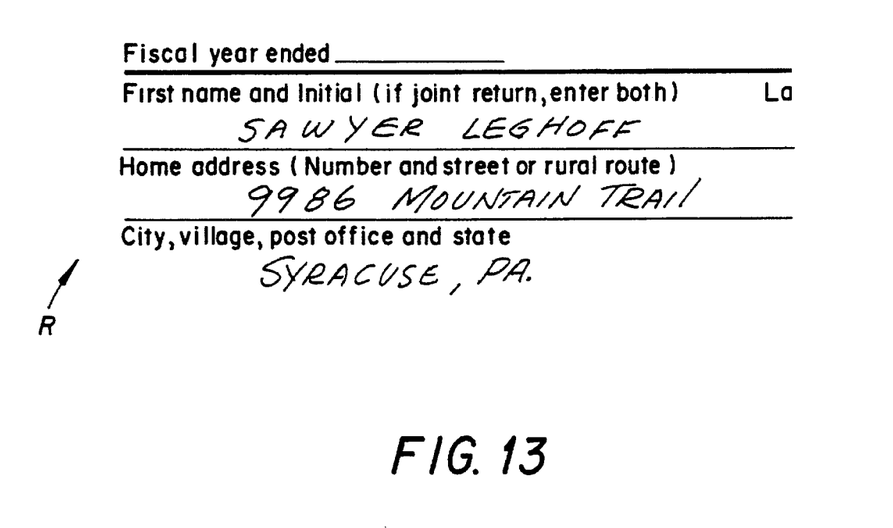
FIG. 13 is an illustration of a reproduction of a document sheet that is reproduced in accordance with an auto-exposure method and apparatus of the invention with auto-exposure correction.

Reference will now be made to FIG. 3 which illustrates in more detail a block diagram of a portion of the control logic package 22 as it relates to features associated with the invention in combination with other cooperating elements. The scanner device 18 creates a real image video data stream 3-7 that is sent to a storage area memory 3-2 and a histogram creation hardware circuit 3-5. The histogram creation hardware will store the histogram in a static RAM, as will be described below. A window controller 3-11 will determine what area of the image to gather data from. The window controller is responsive to signals derived from area identification data using digitizer 26 of the selected area, R, on the original document sheet that is to receive the autoexposure treatment whereas the rest of the document sheet is to be copied without such autoexposure treatment. As noted above, the operator can input the corners (say only two opposite diagonal corners) that represents an area portion of the document sheet 42 which includes say black foreground text on a green background. A reproduction of document sheet 42 is to reproduce document sheet 42 with the black foreground text on a white background of the copy sheet without the poor rendition typical of such reproductions; compare FIGS. 12 and 13. Assume in this example that other areas of document sheet 42 are reproduced identically to that of the original. To assist the operator to provide area correction, a prompt screen is provided on the OCP display screen 25 wherein by using a soft key the operator can scroll through a series of available features on a page level basis and selecting an Auto Exposure mode. As understood in the art, see for example, U.S. Pat. No. 5,113,222, the pertinent contents of which are incorporated herein by reference, reproductive treatment of a multisheet document may be done on a page-by-page programmed set up by designating a selected page in the multisheet document as determined by the document handler's feeding of selected pages or by input of page number by the operator. The display screen may denote the area selected or that an inner part of the area is to receive this special treatment and the outer is not or vice versa. See FIG. 11.

Figures 4, 5, 7:
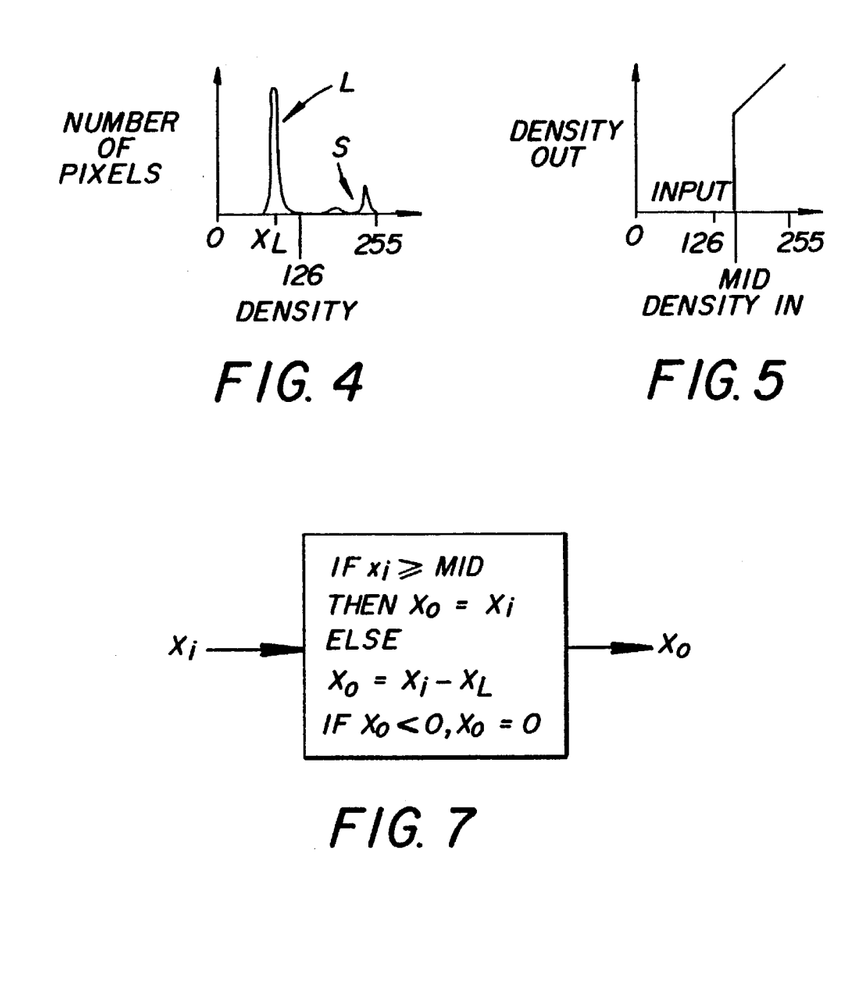
FIG. 4 is a histogram of density data of a selected area in an original document sheet that is to be copied in an auto exposure mode by the apparatus and method of the invention.
FIG. 5 is a graph of a video clip look-up table that is used in accordance with one embodiment of the invention.
FIG. 7 is an example in schematic of an operating algorithm of a video shift look-up table that is used in accordance with another embodiment of the invention.

The image data of the selected area, if plotted, would look something like the graph shown in FIG. 4 with two distinct distributions, the larger L representing the green background video, the smaller S representing the foreground video such as printed text and pencil information. At this time, the CPU 3-6 can read the histogram and perform a software algorithm on the histogram data. The algorithm finds the foreground video value, background video value and midpoint between the foreground and background video values. This information is then used to program the output video clip or shift hardware 3-3. The video clip could be implemented via a look-up table or comparator. If implemented in a look-up table, the values in the table when plotted would look something like FIG. 5. This function causes the background video values in the designated area R only to go towards white as it is extracted from the image storage area 3-2, and sent to the marking engine 12. If the image were resampled at 3-9, the histogram would look something like that shown in FIG. 6. Prior to sending the data to the marking engine 12, the data may be subjected to further image processing by image processor such as edge enhancement, etc., by image processor 20.

Figure 9:
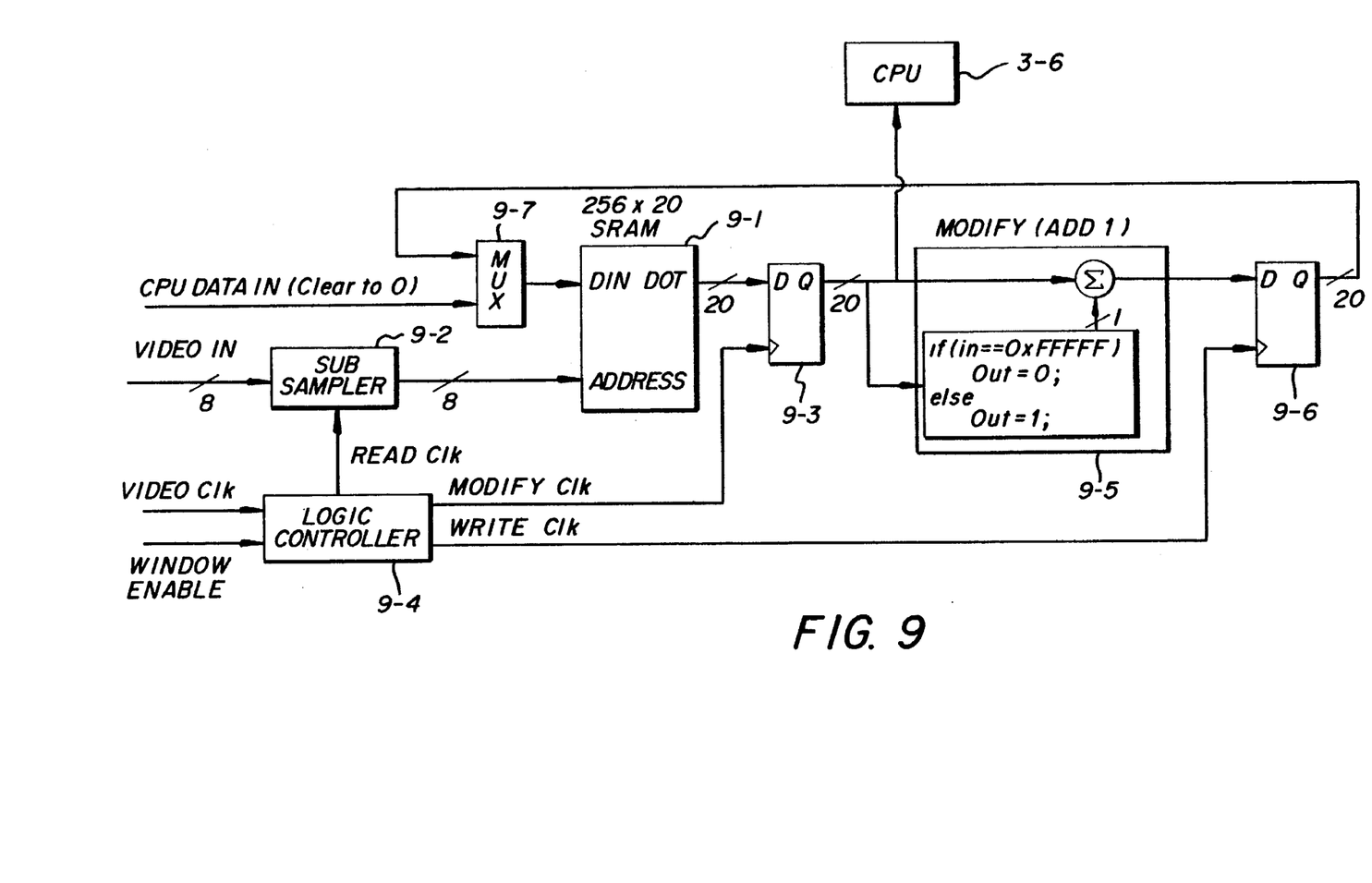
FIG. 9 is a block diagram of a histogram creation circuit shown in FIG. 3.

The scanner device 18 in FIG. 3 transforms the original image into a digital 8-bit pixel video stream of data. This video stream enters the histogram creation hardware 3-5 which is depicted in more detail in FIG. 9. The histogram SRAM 9-1 locations are initially cleared to zero. The video input data stream that represents the original image can be subsampled by subsampler 9-2 which, for example, selects every fourth pixel to reduce the number of pixels used in histogram creation. The video value; i.e., intensity value, acts as a pointer (address) into the SRAM. The value at that address is read, output as a 20-bit wide count signal to a latch 9-3. In response to a modify clock signal from a logic controller 9-4 the 20-bit count signal is shifted to the output of latch 9-3 where it is input to a modify by adding 1 logic hardwired device 9-5. The incremented value from device 9-5 is then stored in latch 9-6. In response to a write clock pulse from logic controller 9-4, input to latch 9-6, the incremented count, is output from the latch 9-6 and input to a multiplexer 9-7. The multiplexer 9-7 is also responsive to a signal from the logic controller 9-4 and in response thereto inputs or writes the incremented count signal to the same address from which the non-incremented count was previously read. Thus, the count at the address in SRAM indicated by the 8-bit sampled image data signal is now incremented by one. A test is also performed to avoid rollover. Thus, in the 256-20 bits SRAM, there is stored at each of 256 addresses a count 20-bits wide of the number of pixels having a particular density with the densities varying from 0–255. Also, as may be seen in FIG. 9 when the sampling of the pixels in the area designated by the digitizer is complete, the data comprising the completed histogram is read by the central processing unit CPU 3-6 and subjected to processing in accordance with a program whose flowchart is illustrated in FIG. 10.

The window controller 3-11 will enable the Histogram Creation circuit for the area, R, of the image the operator designates via the digitizer 26.

At this time, the 8-bits per pixel image of the entire area of the document sheet is stored in the image storage (3-2) buffer memory area. Note that in Histogram Creation only the designated area is used to create the histogram.

Figure 10:
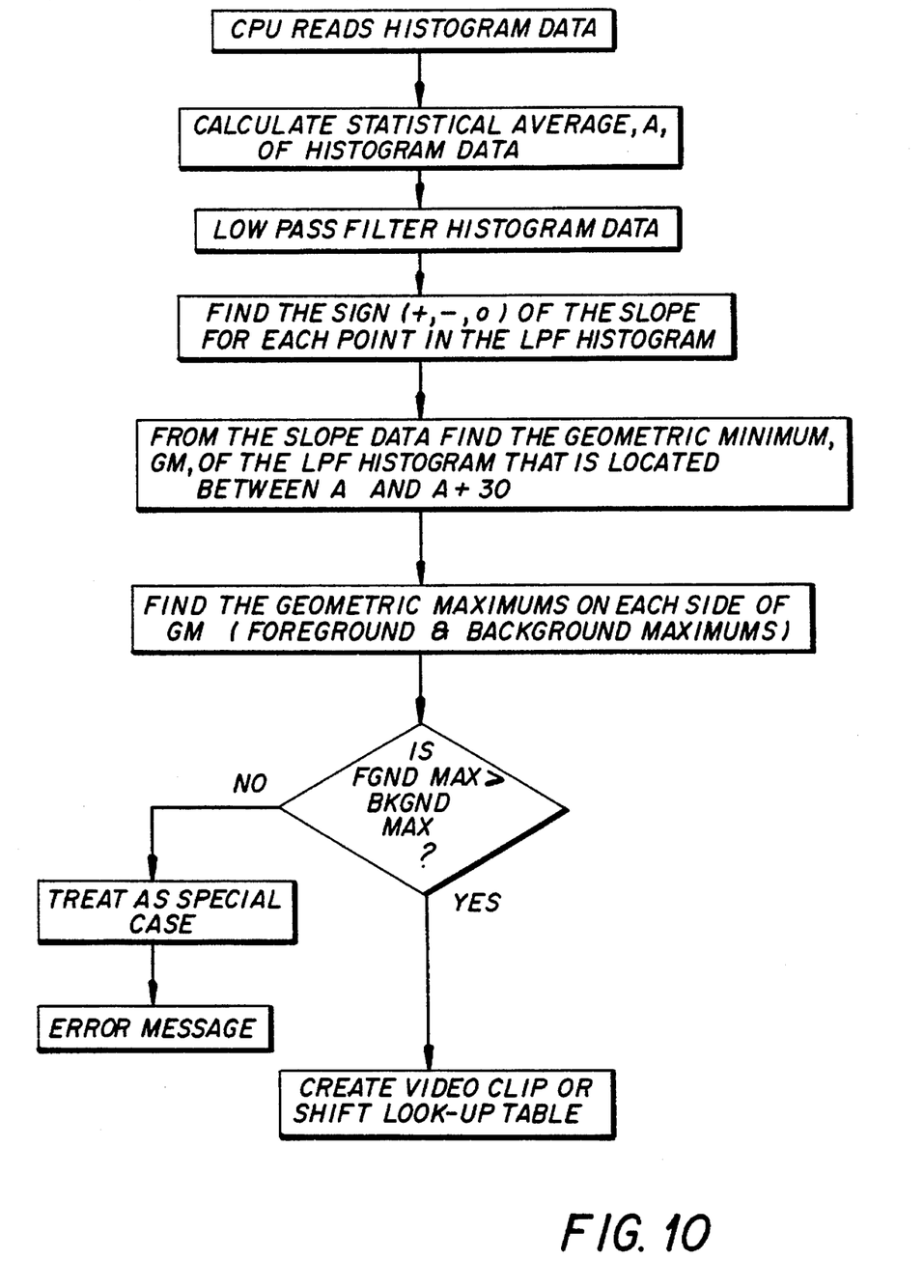
FIG. 10 is a flowchart of an algorithm used in processing image data in accordance with the invention.
Figure 14:
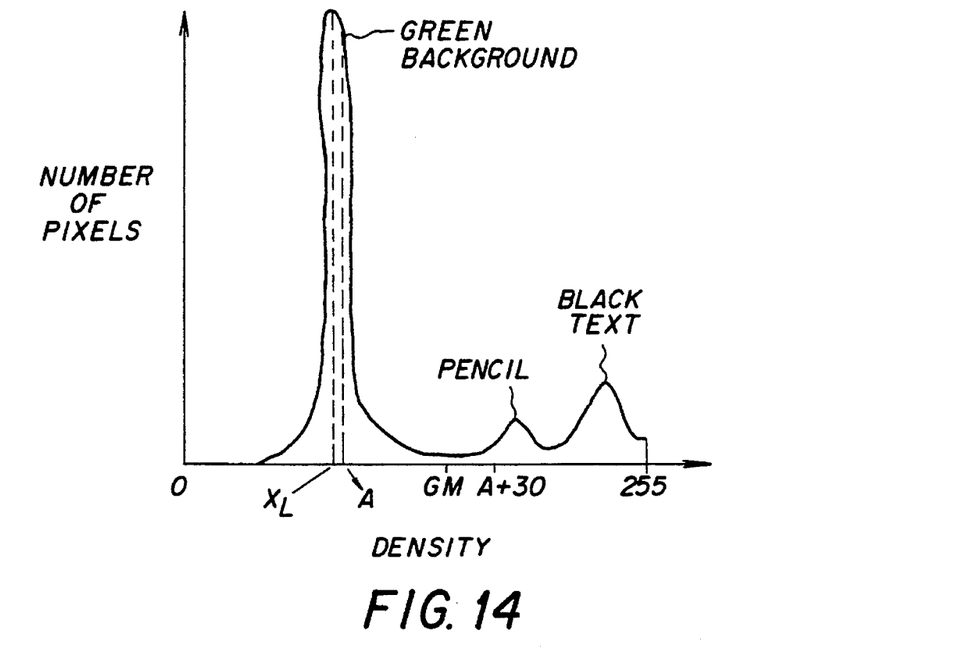
FIG. 14 is a histogram similar to FIG. 4 but enlarged.
Figure 15:
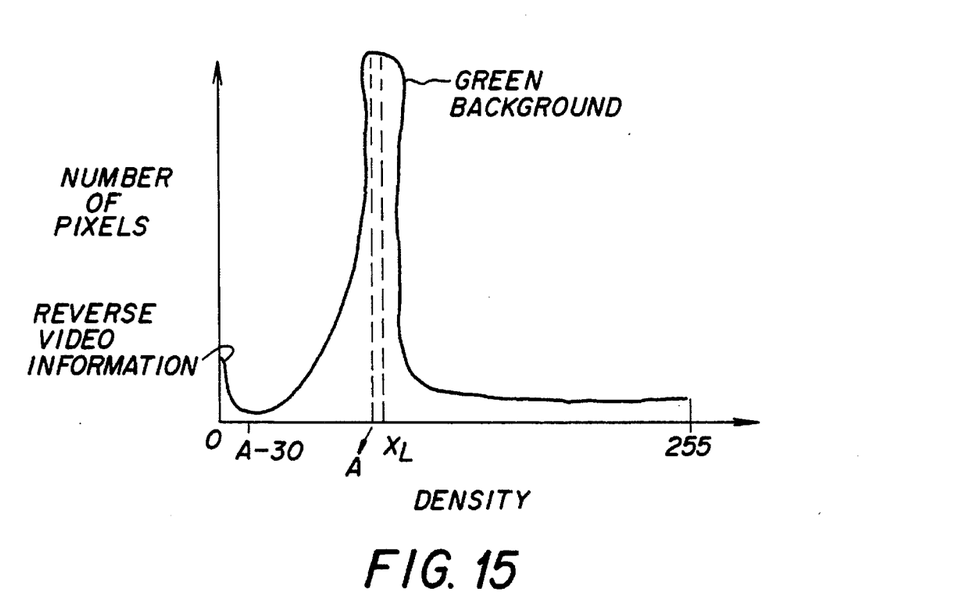
FIG. 15 is a histogram of a document that includes a background area with density and reverse video information.

As noted in the flowchart of FIG. 10 and with reference to FIG. 14, the CPU first reads the histogram data of the designated area R. It then finds the statistical average, A, of the histogram data. The histogram data is then subjected to a low pass filter (LPF) to define reasonably smooth curves rather than the discrete histogram data. The sign (−, + or 0) of the slope for each grey level point in the LPF histogram curve is then calculated and stored. The geometric minimum, GM, located in the range between A and A+30 of the LPF histogram curve is then found from the slope data. The value 30 is selected to designate a location reasonably near the average A so that there is unlikely to be a second peak between A and A+30. The geometric maximums on each side of the geometric minimum, GM, (foreground and background humps) are then found using the stored slope data. Based on the data calculated, a decision is made as to whether or not this is a special case. For an expected typical case two assumptions are made. One is that the relationship of geometric maximums is such that the background maximum is greater than the foreground maximum and the other is that the statistical average is near the highest geometric maximum over the entire range 0–255. Thus, in a typical case the number of background pixels in the designated area would be expected to be much more than the printed text and/or pencil writing that is the foreground. If the data does not meet the assumptions of a typical case, it is considered a special case. An example of a special case is a reverse video image where we have white characters on a dark background (see FIG. 15). This can be investigated for and detected by examining for a geometric minimum in the range between A–30 and A. In such a special case, it is expected that the greatest geometric maximum will be found to the right of this geometric minimum. In a second example of a special case, there may be detected a foreground maximum. In such a case the program would indicate via the display screen an error signal and request or prompt the operator to remove the document sheet or select a different area. Assuming that the selected area is not considered a special case or the factor making same a special case is resolved to allow the algorithm to operate at the next level, the algorithm now operates to create a video clip look-up table that is based on the data determined from the designated area of the document sheet. The dynamically created table of data is then stored in the video clip hardware memory device. The image data for the entire document sheet is then extracted from the image storage area 3-2, passed through the look-up table of the video clip 3-3 where pixels representing the background information in the designated area are converted to white pixels and the foreground information is unchanged, and passed to the marking engine 12.

The video clip data is created by defining the midpoint between the two geometric maximums; i.e. the one for the background and in this example the one for the pencil data. Image density data to the right of the midpoint is reproduced at the original density and image data to the left of the midpoint is reduced to zero. Alternatively, the geometric minimum, GM, may be used as the dividing line in lieu of the midpoint.

The window controller 3-11 is connected to logic in the video clip hardware to ensure that only image data in the area designated by the digitizer is subject to modification by the video clip look-up table, image data outside the designated area bypasses the table or is unchanged.

Figures 6, 8:
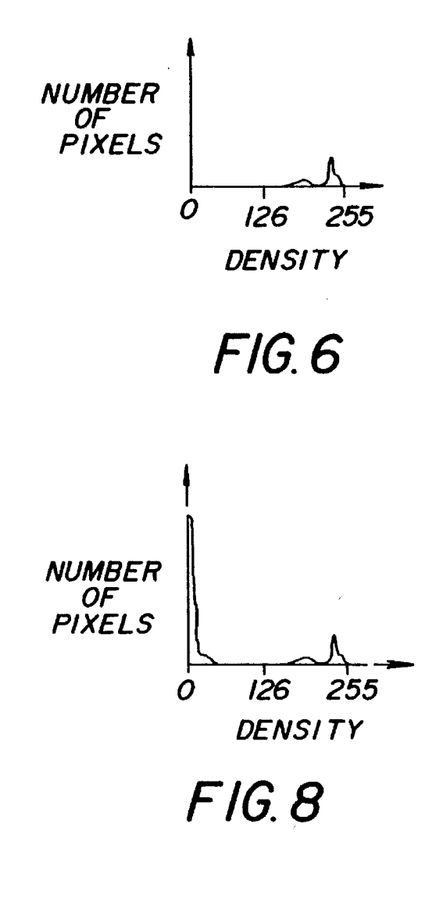
FIG. 6 is a histogram of density data of an auto-exposed image of the selected area as modified in accordance with the clip algorithm of FIG. 5.
FIG. 8 is a histogram of density data of an auto-exposed image of the selected area as modified in accordance with the shift algorithm of FIG. 7.

With reference now to FIGS. 7 and 8, in lieu of a video clip look-up table, a video shift function operation or other type of look-up table may be provided wherein each pixel in the designated area is subject to a mathematical operation wherein the center of the background hump $X_L$ is determined and subtracted from each of the 8-bit gray levels for those pixels less than the midpoint. Those pixels with video or intensity levels greater than or equal to the midpoint are unchanged. The resulting data, if analyzed at 3-9, would form a histogram as shown in FIG. 8.

As known in the art, Document Recognition as described in U.S. Pat. No. 4,922,350 employs the scanner when scanning the document during a preliminary scan to determine the edges of the document sheet on the platen as distinguished from the background of the cover to the platen which cover overlies the document. The data from the scan for Document Recognition, or document orientation, in conjunction with designation of the area via the digitizer can be used to define the location of the selected area vis-a-vis a particular corner of the document sheet even though the document sheet while being scanned is not well registered to a fixed part of the platen. Thus, the invention contemplates a means for scanning the document to detect the orientation of the document during a prescan or a mainscan and for generating signals relative to the location of an edge or a corner of the scanned document regardless of its orientation. The invention further contemplates that the background density area may be automatically determined by examining the scanning data along the periphery of a continuous area of density and if the boundary of such area is a fixed number of pixels thick, generating signals representing an approximate rectangle of such area for enabling histogram creation of the pixels in such area. Furthermore, the invention contemplates that histogram creation may be entirely software operated, partly software and partly hardware or all hardware operated.

ADVANTAGES

Thus, there has been described an improved copier apparatus and method having an Auto Exposure feature that gathers an enormous amount of sample pixels for creating a histogram of a designated area and thus provides greater accuracy to determine the background video level in such area and minimizes the susceptibility of gross errors. A further advantage to the apparatus and method of the invention is that only a single scan of a document is required to reproduce same.

FIGS. 6 and 8 demonstrate that the shape of the information is preserved, hence, preserving the edge information around the characters which preserves image quality.

The invention has been described in detail with particular reference to preferred embodiments thereof and illustrative examples, but it will be understood that variations and modifications can be effected within the spirit and scope of the invention.

I claim:

1. An electrostatographic reproduction apparatus comprising:

scanning means for scanning and outputting first signals representing intensity variations in an original image on a document sheet;

designating means for generating second signals representing information relative to a determined image area of the document sheet containing both foreground information and background density;

area operation means responsive to the first and second signals for generating third signals representing parameters for substantially eliminating the background density while substantially preserving information with foreground density; and an electrostatographic marking engine including means responsive to said third signals for reproducing a copy of the document sheet with the foreground information without the background density in the area corresponding to the determined area;

and wherein the area operation means includes:

means for generating a histogram of pixel densities and their frequencies for pixels residing within the determined image area;

means for subjecting data in said histogram to a low pass filter and outputting filtered data;

means for determining a slope of points in said filtered data;

means for defining a geometric minimum within a predetermined amount of a statistical average of the histogram data;

means for determining geometric maximums on each side of the geometric minimum; and means for comparing a maximum on one side with a maximum on the other side and defining said parameters if one particular maximum is greater than the other.

2. The apparatus of claim 1 and wherein the third signals representing said parameters define a video clip look-up table.

3. The apparatus of claim 1 and wherein the third signals representing said parameters define a video shift look-up table.

4. The apparatus of claim 1 and including means responsive to said first signals, second signals and third signals for generating fourth signals for output to a marking engine.

5. The apparatus of claim 4 and wherein pixels not within said determined image area are not input to said memory means.

6. The apparatus of claim 5 and wherein the marking engine is an electrostatographic marking engine.

7. The apparatus of claim 6 and wherein the marking engine includes an electronic print source that modulates light with image data to record an image.

8. An image processing apparatus comprising:

scanning means for scanning and outputting first signals representing image data as determined by sensing intensity variations in an original image;

area designating means for generating second signals representing information relative to a determined image area of the document containing both foreground and background density;

area operation means responsive to the first and second signals for operating on the image data in the area to define third signals representing parameters for substantially eliminating the background density while substantially preserving information with foreground density; and memory means for storing said third signals;

and wherein the area operation means includes;

means for generating a histogram of pixel densities and their frequencies for pixels residing within the determined image area;

means for subjecting data in said histogram to a low pass filter and outputting filtered data;

means for determining a slope of points in said filtered data;

means for defining a geometric minimum within a predetermined amount of a statistical average of the histogram data;

means for determining geometric maximums on each side of the geometric minimum; and means for comparing a maximum on one side with a maximum on the other side and defining said parameters if one particular maximum is greater than the other.

9. The apparatus of claim 8 and wherein the third signals representing said parameters define a video clip look-up table.

10. The apparatus of claim 8 and wherein the third signals representing said parameters define a video shift look-up table.

11. The apparatus of claim 8 and including means for responsive to said first signals, second signals and third signals for generating fourth signals for output to a marking engine.

12. The apparatus of claim 11 and wherein pixels not within said determined image area are not input to said memory means.

13. The apparatus of claim 12 and wherein the marking engine is an electrostatographic marking engine.

14. The apparatus of claim 13 and wherein the marking engine includes an electronic print source that modulates light with image data to record an image.

15. The apparatus of claim 8 and wherein pixels not within said determined image area are not input to electrostatographic marking engine.

16. An image processing method comprising:

scanning image data on a document and outputting first signals representing intensity variations in an original image;

designating an image area of the document containing both foreground and background density and generating second signals representing said area;

in response to the first and second signals operating on the image data in the area to define third signals representing parameters for substantially eliminating the background density while substantially preserving information with foreground density and printing a reproduction of image data on the document with the foreground information reproduced but background density in the original of the designated area eliminated;

and wherein the step of operating includes;

generating a histogram of pixel densities and their frequencies for pixels residing within the determined image area;

subjecting data in said histogram to a low pass filter and generating filtered data;

determining a slope of points in said filtered data;

defining a geometric minimum within a predetermined amount from a statistical average of the histogram data;

determining geometric maximums one each side of the geometric minimum; and comparing a maximum on one side with a maximum on the other side and defining said parameters if one particular maximum is greater than the other.

17. The method of claim 16 and wherein the third signals representing said parameters are stored as a video clip look-up table.

18. The method of claim 16 and wherein the third signals representing said parameters are stored as a video shift look-up table.

19. The method of claim 16 and wherein the printing is done by a marking engine that is an electrostatographic marking engine.

20. The apparatus of claim 6 and wherein the marking engine includes an electronic print source that modulates light with image data to record an image.

21. The apparatus of claim 20 and wherein the marking engine is a grey level marking engine that forms pixels of varying grey levels in accordance with a multibit image data signal.

22. The method of claim 19 and wherein the marking engine is a grey level marking engine that forms pixels of varying grey levels in accordance with a multibit image data signal.

23. The method of claim 17 and wherein in response to said third signals and said first signals, a multibit signal is defined for each pixel to be printed by a grey level marking engine, and printing pixels of varying grey levels by said grey level marking engine.

24. The method of claim 18 and wherein in response to said third signals and said first signals, a multibit signal is defined for each pixel to be printed by a grey level marking engine, and printing pixels of varying grey levels by said grey level marking engine.

* * * * *